June 3, 1958 — W. L. BLAKESLEE — 2,837,190
OVERLOAD RELEASE CLUTCH
Filed Nov. 16, 1954
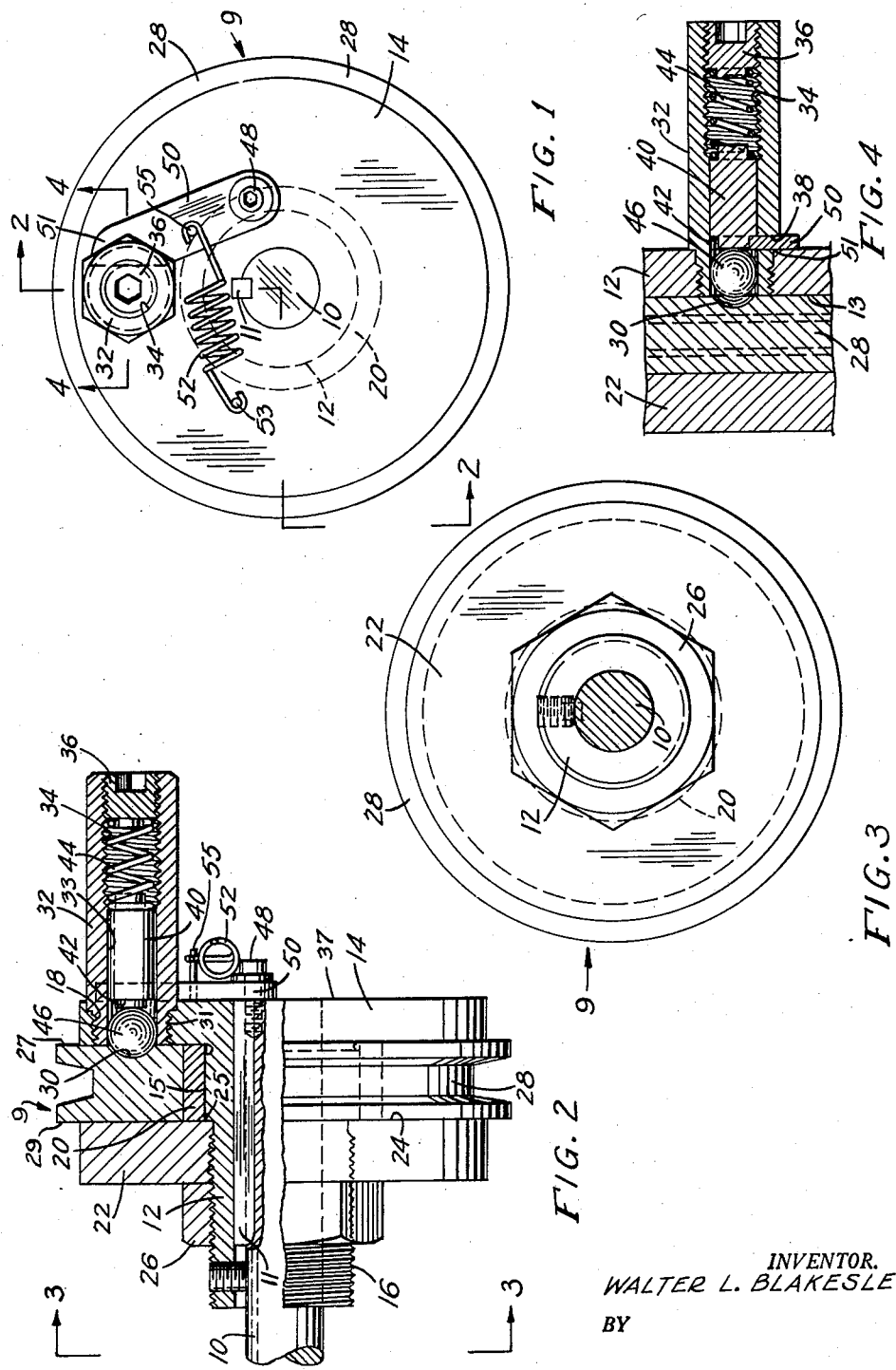
INVENTOR.
WALTER L. BLAKESLEE
BY
McMorrow, Berman & Davidson
ATTORNEYS United States Patent Office 2,837,190
Patented June 3, 1958

2,837,190

OVERLOAD RELEASE CLUTCH

Walter L. Blakeslee, Youngsville, Pa.

Application November 16, 1954, Serial No. 469,081

2 Claims. (Cl. 192—56)

This invention relates to an improved overload released clutch.

The primary object of the invention is to provide a more efficient and mechanically superior device of this kind which is composed of a small number of simple parts, and which can be made in rugged and serviceable forms at relatively low cost.

A further object of the invention is to provide a clutch of this kind which avoids chatter during the period that the driving connection is interrupted and which maintains the interruption of the driving connection until such time as the driving connection is manually restored.

Other objects and advantageous features of the invention will be apparent from the following description and the accompanying drawings, wherein, for purposes of illustration only, a specific form of the invention is set forth in detail.

In the drawings:

Figure 1 is an end view of an overload release clutch embodying the features of this invention;

Figure 2 is a fragmentary side elevation and sectional view taken substantially on the line 2—2 of Figure 1;

Figure 3 is a transverse sectional view taken substantially on the line 3—3 of Figure 2; and Figure 4 is an enlarged fragmentary sectional view taken substantially on the line 4—4 of Figure 1.

Referring to the drawings in detail, the illustrated clutch 9 is shown as secured on a driven shaft 10 and comprises an elongated hub 12 keyed at 11 to the shaft 10 and having on one end an enlarged diameter annular flange defining a fixed clutch disc 14. The hub 12 is provided adjacent the end thereof remote from the clutch disk 14 with external screw threads 16. Extending through the disk 14 in spaced parallel relation to the axis of the shaft 10 is an internally screw threaded opening 18, the purpose of which will hereinafter appear.

Surrounding a smooth portion 15 of the hub 12 adjacent the inner side 13 of the clutch disc 14 is a bearing ring 20. Threaded on the hub at the inner side of the ring 20 is a collar 22 of substantially the same diameter as the disc 14, which cooperates with the ring 20 and the disc 14 in defining an annular space 24. A nut 26 is threaded on the threads 16 of the hub 12 and bears against the outer side of the collar 22, and the inner side of the collar bears against a shoulder 25 on the hub at the adjacent end of the smooth portion 15.

Mounted for rotation on the smooth portion 15 of the bearing ring 20 within the space 24 is a rotary clutch disc 28 having a recess 30 in its outer side 27 adjacent the fixed clutch disc 14 which is adapted to register with the opening 18 in the clutch disc 14. The inner side 29 of the rotary disc 28 runs against the collar 22.

Threaded in the opening 18 of the fixed clutch disc 14 is a reduced inner end 31 of a tubular guide 32 whose bore involves a threaded outer end portion 34 and smooth inner end portion 33. A plug 36 is threaded in the outer end portion 34. Opening through the side wall of the tubular guide 32 adjacent the outer side of the fixed clutch disc 14 is a circumferential slot 38. A plunger 40 is slidably positioned in the smooth bore portion 33 of the guide 32 and has on its end adjacent the clutch disk 28 an annular shoulder 42, the purpose of which will hereinafter appear. A coil spring 44 is housed within the tubular guide 32 is compressed between the outer end of the plunger 40 and the plug 36. A ball 46 is confined within the guide 32 between the inner end of the plunger 40 and the outer side 27 of the rotary clutch disc 28 so that the ball 46 can engage in the recess 30. From the structure so far described, it will be evident that by turning the plug 36, the tension of the spring 44 can be varied to regulate the pressure of the ball 46 against the rotary clutch disc 28 and the seating of the ball 46 in the recess 30, so that the amount of torque at which the clutch discs becomes disconnected can be predetermined.

Pivotally mounted at one end, as at 48, on the outer side 37 of the fixed clutch disc 14 at the slotted side of the guide 32 and at a point eccentric with respect to the axis of the disc 14 is a latch arm 50 which, as shown in Figure 1, which has a free end portion 51 which is arranged to pass through the slot 38 and engage behind the shoulder 42 of the plunger 40. A contractile coil spring 52 is stretched between a pin 53 on the clutch disc 14 and a pin 55 intermediate the ends of the latch arm 50 to yieldingly urge the latch arm into engagement with the plunger 40.

In use, it will be evident that when torque is applied to one of the clutch disks 14 or 28 with the clutch ball 46 engaged in the recess 30 the disks 14 and 28 are caused to rotate in unison. Should a load on the driven shaft 10 exceed a predetermined value, the ball 46 will be cammed out of the recess 30 and move outwardly, along with the plunger 40, against the resistance of the spring 44, until the ball 46 rides on the outer side 27 of the disc 28. In this action, the plunger 40 moves outwardly in the guide 32 until the shoulder 42 passes outwardly beyond the latch arm 50, whereas the spring 52 moves the free end portion 51 of the latch arm in front of the shoulder 42, so that the plunger 40 is held in a retracted position and the ball 46 is relieved of the pressure of the spring 44 during relative rotation of the clutch disks 14 and 28. In this way, wear on the clutch disks is avoided and undesirable noise and chattering is eliminated. The retracted position of the plunger 40 is maintained until such time as the latch arm 50 is manually disengaged from the shoulder 42 of the plunger, at which time the spring 44 urges the plunger inwardly toward the clutch disc 28 and this retrieves the clutch ball 46 into spring-pressed engagement with the disc 28 so that the ball 46 can reseat itself in the recess 30 and reconnect the clutch discs for driving the shaft 10.

While in the foregoing there has been shown and described the preferred embodiment of this invention, it is to be understood that minor changes in the details of construction, combination and arrangement of parts may be resorted to without departing from the spirit and scope of the invention as herein claimed.

What is claimed is:

1. In an overload release clutch, a hub having an enlarged diameter fixed clutch disc thereon, a shoulder on the hub spaced from said fixed disc and facing away from said fixed disc, a collar secured on the hub and having an inward side engaging said shoulder, a rotary clutch disc circumposed on said hub and confined between said collar and the fixed clutch disc, said collar being positioned from said fixed clutch disc a distance substantially equal to the width of said rotary clutch disc, said rotary clutch disc having an outer side provided with a socket, and spring-pressed detent means on said fixed clutch disc releasably engageable in said socket, said detent means comprising a tubular guide mounted on and traversing said fixed clutch disc, said guide having an inner end and an outer end, a ball confined in the guide at the inner end thereof, a plunger working in the guide, said plunger having an inner end engaging said ball and an outer end, a plug threaded in the outer end of the guide, and an expanding spring compressed between said plug and the outer end of the plunger, said fixed clutch disc having an outer side, and said guide having a side wall provided with an arcuate slot located at the outer side of the fixed clutch disc, a latch arm pivoted on the outer side of the fixed clutch disc having a free end arranged to pass through said slot and engage the plunger, spring means acting between the fixed clutch disc and the latch arm and urging the free end of the latch arm toward the plunger, said plunger having a shoulder on its inner end with which the free end of the latch arm is engageable to hold the plunger in an outwardly retracted position.

2. In an overload release clutch, a hub having a fixed clutch disc thereon, said disc having outer and inner sides, a collar fixed on said hub and spaced inwardly from the inner side of the fixed clutch disc, said collar being positioned from said fixed clutch disc a distance substantially equal to the width of said rotary clutch disc, a rotary clutch disc journaled on the hub between the collar and the fixed clutch disc, said rotary disc having an outer side having a socket therein, said fixed disc having therein an opening axially alignable with said socket, a guide tube having an inner end secured in said opening and an outer end, a plunger working in said guide tube and having outer and inner ends, a ball detent in said guide tube at the inner end of the plunger and rollably bearing against the outer side of the rotary clutch disc and seatable in said socket, and spring means confined in said guide tube and bearing against the outer end of the plunger, said guide tube having a transverse slot in its side wall at the outer side of the fixed clutch disc, a spring pressed latch arm pivoted on the outer side of the fixed clutch disc having a free end engaged in said slot and bearing against a side of said plunger while the plunger is in a ball detent seating position, said free end of the latch arm being engageable with the inner end of the plunger in an outwardly retracted position of the plunger when the ball detent is out of said socket.

References Cited in the file of this patent

UNITED STATES PATENTS

| | | |
|---|---|---|
| 871,110 | Comings | Nov. 19, 1907 |
| 2,045,572 | Dow | June 30, 1936 |
| 2,497,893 | Linahan | Feb. 21, 1950 |
| 2,530,887 | Mandl et al. | Nov. 21, 1950 |
| 2,539,425 | Huntar | Jan. 30, 1951 |